United States Patent
Katz (10) Patent No.: US 8,518,312 B2
(45) Date of Patent: Aug. 27, 2013

(54) LIGHTWEIGHT, MULTI-LAYERED STRUCTURAL COMPOSITES USING RECYCLED LANDFILL-BOUND SCRAP

(76) Inventor: Jean-Jacques Katz, Novi, MI (US)

(*) Notice: Subject to any disclaimer, the term of this patent is extended or adjusted under 35 U.S.C. 154(b) by 0 days.

(21) Appl. No.: 13/608,253

(22) Filed: Sep. 10, 2012

(65) Prior Publication Data

US 2013/0000826 A1 Jan. 3, 2013

Related U.S. Application Data

(63) Continuation-in-part of application No. 12/715,084, filed on Mar. 1, 2010, now Pat. No. 8,262,959.

(51) Int. Cl.
*B27N 3/10* (2006.01)

(52) U.S. Cl.
USPC .................. 264/112; 264/113; 264/115

(58) Field of Classification Search
None
See application file for complete search history.

(56) References Cited

U.S. PATENT DOCUMENTS

| | | |
|---|---|---|
| 5,807,513 A | 9/1998 | Gebreselassie et al. |
| 6,110,580 A | 8/2000 | Gebreselassie et al. |
| 7,918,952 B1 * | 4/2011 | Young .......................... 156/62.2 |
| 8,262,959 B2 * | 9/2012 | Katz ............................. 264/115 |
| 2006/0127664 A1 * | 6/2006 | Geary et al. ................ 428/317.9 |
| 2006/0144012 A1 | 7/2006 | Manning et al. |
| 2006/0251881 A1 | 11/2006 | Gilder |
| 2007/0066692 A1 | 3/2007 | De Juan Saiz et al. |
| 2012/0052760 A1 * | 3/2012 | Doyle et al. .................. 442/288 |

* cited by examiner

*Primary Examiner* — Mary F Theisen
(74) *Attorney, Agent, or Firm* — Gifford, Krass, Sprinkle, Anderson & Citkowski, P.C.

(57) ABSTRACT

A composite structure is based on a sandwich construction and a one-step molding process. The composite structure or component comprises a core layer having two outer layers on each side of the core layer. The outer layers may be composed of automotive interior trim scrap adhered with an isocyanate adhesive composition. Core layer and outer layers are thermally pressed in a single step or process to form the finished structural, multi-layer product. Decorative layers can be added as part of the one-step process. The resulting panels can be used in the manufacture of automotive, construction, furniture and other components.

16 Claims, 5 Drawing Sheets

| Surface Mats and Core | Packaging for Processing | PU Spray/ Casting | Compression Molding/Curing |

LIGHTWEIGHT, MULTI-LAYERED STRUCTURAL COMPOSITES USING RECYCLED LANDFILL-BOUND SCRAP

REFERENCE TO RELATED APPLICATION

This application is a continuation-in-part of U.S. patent application Ser. No. 12/715,084, filed Mar. 1, 2010, the entire content of which is incorporated herein by reference.

FIELD OF THE INVENTION

This invention relates generally to the use of recycled scrap materials and, in particular, to the production of molded, multi-layered structural panels using such materials.

BACKGROUND OF THE INVENTION

The advent of prepreg technology for high-performance aerospace, railway, energy, marine, sports and leisure applications has resulted in the pioneering use of multi-layered composites, or sandwiches, for structural applications.

A prepreg consists of a combination of a matrix (resin) and fiber reinforcement in the form of woven or non-woven mats. Fiber reinforcement is available in unidirectional form (one direction of reinforcement) or in fabric form (several directions of reinforcement). The role of the matrix is to support the fibers and bond them together in the composite material. In order to give the finished composite environmental and temperature resistance, matrix resins are in their overwhelming majority thermoset materials.

Depending upon final temperature exposure and desired mechanical properties, the resin is selected from three different polymer classes: phenolic, epoxy and bismaleimide/polyimide. Recent developments, however, have demonstrated that unsaturated polyester resins, which are easier to handle than epoxy resins, can be also used for prepreg manufacturing.

Wetted fibers, through the application of the matrix resin, become stronger and stiffer; as a result, they support most of the applied loads. Unidirectional composites have mechanical properties in one direction (anisotropic); on the other hand metals are isotropic, i.e. have equal properties in all directions.

Figure 1:
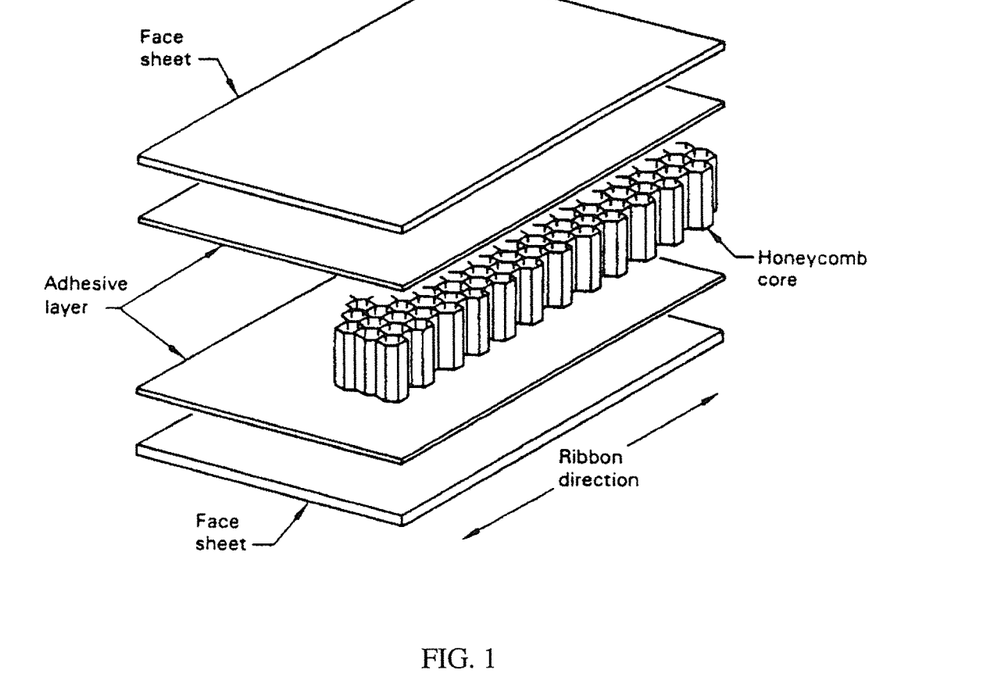
FIG. 1 illustrates a honeycomb construction used in prepreg structures.
Figure 2A:
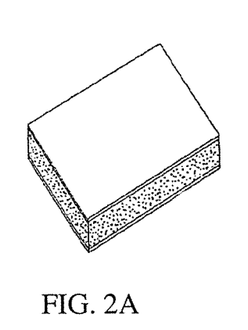
FIGS. 2A-2C shows the types of honeycomb cores used in honeycomb constructions.
Figure 2B:
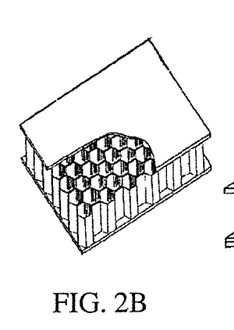
Figure 2C:
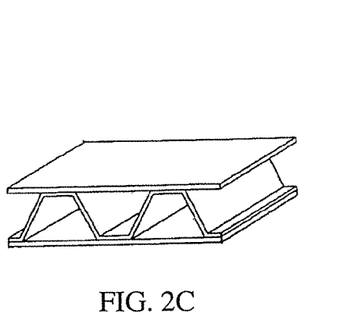

Prepreg sandwich constructions (FIG. 1) are the most prevalent composites in use today. Such constructions consist of thin, high strength skins (or outer layers) bonded through the optional use of an adhesive film layer to a thicker, light weight core material that can be balsa wood, foam or a circular or polygonal-hollowed construction, generally a honeycomb having an hexagonal shape (FIG. 2).

Performance characteristics of this type of construction are:

Tensile and compression stresses are supported by the skins,
The skins are stable across their whole length,
Shearing stress is supported by the core (honeycomb),
Rigidity is available in several directions, and
Excellent weight savings.

Figure 3:
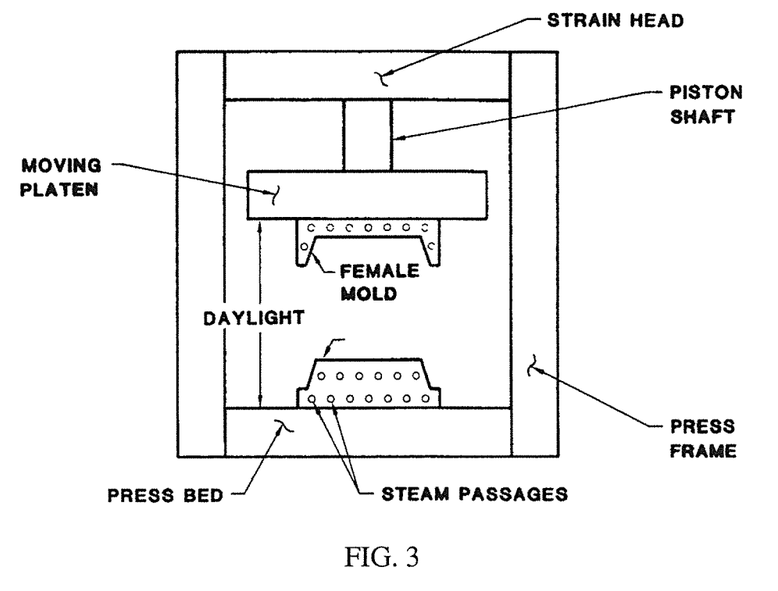
FIG. 3 depicts a prepreg compression molding process.

Prepreg sandwiches can be manufactured by complex and costly processes such as autoclaving or vacuum bag molding. However, press or compression molding has also been used (FIG. 3) and has become more prevalent.

In summary, prepreg technology is a complex and costly process whose use is justified by the demanding and highly critical technical requirements of targeted aerospace applications. Its benefits are lower weights than these available with previously-used metallic constructions, greater strength and higher stiffness.

More recently, technical advances in the field of polyurethane chemistry and processing have made the prepreg sandwich concept and its production more affordable and easier to implement. This has resulted in molded polyurethane articles, such as polyurethane foams and polyurethane composites that are now extensively used by the automotive, construction and furniture industries. Such articles are generally available in the form of sandwich, or multi-layered, constructions, that produce high strength, structural parts.

The leading polyurethane technology, marketed under the trade name Baypre® F (Bayer AG, Germany), is described in U.S. Pat. No. 6,156,811 (hereafter referred to as the '811 patent) and U.S. Pat. No. 7,419,713 B2 (hereafter referred to as the '713 patent).

Figure 4:
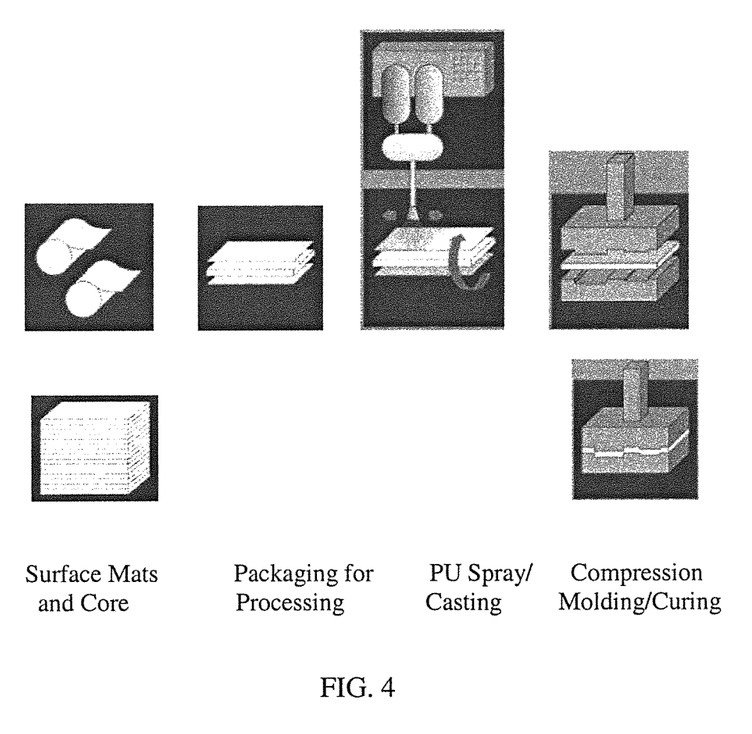
FIG. 4 shows the Baypreg® F Molding Process.

This approach relies on a multi-step process whereby a composite component is created by producing a sandwich structure made of at least one core layer located between at least two outer layers. The steps described in the '713 patent are the following (FIG. 4):

(i) Insert the core and the outer layers into a compression mold, the core being located between the outer layers. The core is a honeycomb structure and the outer layers are glass fiber or natural fiber mats.

(ii) Apply a polyurethane resin either by a casting or a spraying operation on one or both outer layers. Steps (i) and (ii) can be performed in any order.

(iii) Compression mold under high heat the core with the outer layers to cure the resin and form the sandwich structure.

(iv) Optionally attach decorative layers on top of the top outer layer and or below the bottom outer layer only after steps (i) to (iii) are completed.

The present invention improves on the above process by sequentially placing bottom outer layer, core layer, and top outer layer in the compression mold and allowing the finished part or component to be manufactured in a single press mold, using a single step or molding process, without the additional step of applying a polyurethane resin. Optional bottom decorative layers and top decorative layers can be added as part of the process, if desired.

The present invention therefore presents two key benefits over the prior art, by providing a single step process to produce a finished component, including the optional addition of decorative layers, in a single mold, and the elimination of resin application to the outer layers which results in less expensive and lighter weight panels.

SUMMARY OF THE INVENTION

This invention is concerned with molded, multi-layered articles prepared from recycled material such as automotive interior trim scrap, and the use of such articles in the automotive, construction and furniture industries. In the preferred embodiment, multi-layer, finished components or parts are formed in a single process involving two outer layers positioned on each side of a core layer. Decorative layers can be optionally positioned on top of the top outer layer and, or, below the bottom outer layer. The core layer can have a corrugated structure, a honeycomb structure, a solid structure, or a partially voided structure created by the presence of circular or other "tubes" arranged in a parallel fashion.

The two outer layers are preferably obtained by shredding automotive interior trim scrap or components into a fluff, and adding an isocyanate adhesive composition, as described in U.S. patent application Ser. No. 12/715,084, incorporated herein by reference. A press mold having top and bottom platens may be used in manufacture. The process includes depositing on the bottom of the mold the fluff mixed with the adhesive composition (bottom outer layer). The core layer is then placed on top of the bottom outer layer; a second layer of fluff mixed with the adhesive composition (top outer layer) is deposited on top of the core layer. In the preferred embodiments, the core layer and outer layers are neither chemically nor mechanically bound, but are instead placed in contact within the forming mold.

An advantage of the invention over prior art processes is the ability to apply on either or both sides of the sandwich comprising the fluff and adhesive placed on both sides of the honeycomb core in the compression mold, a decorative coverstock or textile or other polymeric film, sheet or scrim, without additional adhesive, to produce a trim panel with decorative coverstock or other polymeric film, sheet or scrim adhered either on one side or both sides of the panel.

The decorative coverstock or other polymeric film, sheet or scrim can be dispensed onto the panel as discrete films, sheets, scrims or as continuous rolls. The final step involves the thermal compression molding of the involved layers for a specified amount of time to produce the finished composite. Using a single, compression molding process and a single piece of equipment, a lightweight finished article is produced that is strong, rigid and stiff without the need for cast or spray resin compositions or the use of reinforcing fiber mats, as dictated by the prior art.

Articles produced in accordance with the invention exhibit structural performances at lower weight and cost than components fabricated using prior art methods. Moreover, existing methods require multiple steps and multiple layers to form the desired sandwich structure, followed by attaching one or more optional decorative layers through an additional, subsequent step.

The finished articles may be directed to any structural application in the automotive, construction, furniture, marine, railway, energy, leisure and sports industries. In the automotive industry, for example, finished articles and parts may include, without limitation, headliners, sun shades, moon roofs, package trays, spare tire covers, load floors, rocker panels and other structural parts such as wall panels. In the construction industry, finished goods may be used as sound-insulating and thermal-insulating panels. The invention is not limited in terms of end use.

DETAILED DESCRIPTION OF THE INVENTION

Figure 5:
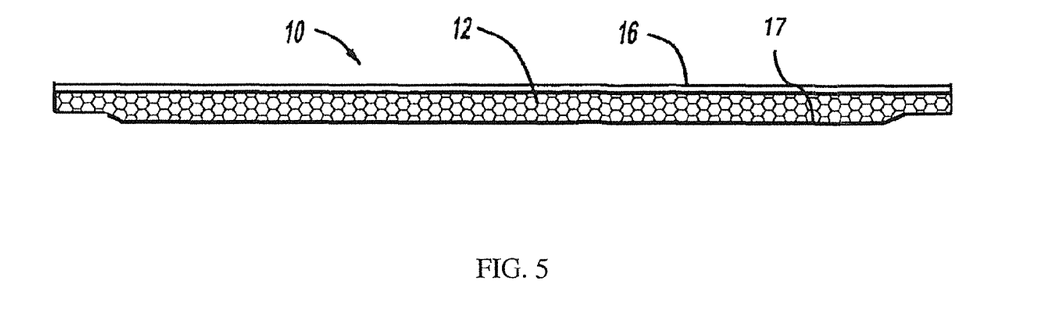
FIG. 5 illustrates a cross-sectional plan view of a finished product manufactured in accordance with the invention.
Figure 6:
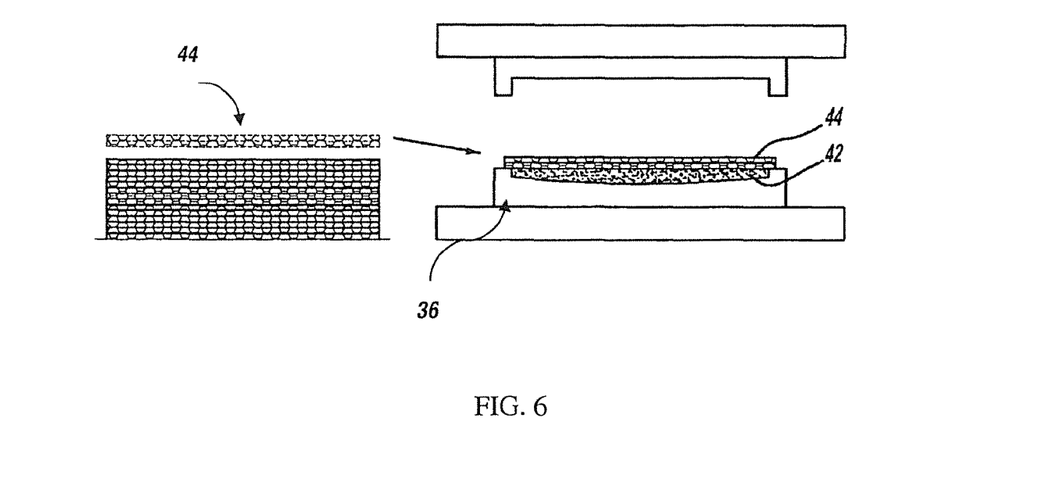
FIG. 6 is the innovative process to form the finished product.

FIG. 5 is a cross-sectional plan view of a finished product manufactured in accordance with the invention. The lightweight composite structure 10 is produced using a one-step molding process described herein below and depicted in FIGS. 6-10. FIG. 6 shows the loading of core layer 44, as a discrete sheet, on top of bottom outer layer 42 which had previously been placed on bottom of tool 36. As represented in FIG. 2A, core layer 44 can incorporate foam, including but not limited to polyurethane foam, preferably rebounded rigid polyurethane foam produced as described in patent application Ser. No. 12/715,084.

The foam core can have a solid structure, or have a partially hollowed space created by the presence of a plurality of tube members arranged parallel to each other and transverse or perpendicular to the planes of the outer layers. Such tubes may be circular or may have a polygonal structure, preferably a honeycomb-like structure, thereby creating open spaces between the outer layers 42 and 43 to produce a rigid and self-supporting core layer 44. FIG. 5 shows a molded core layer 12 having a honeycomb geometry between two molded outer layers 16. Panel thickness ranges from 5 mm to 30 mm. In addition to other core geometries, other panel thicknesses are possible.

Making reference to FIG. 2B, the core structure, whether honeycomb or not, may be constructed from paper or cardboard, resin-impregnated paper or cardboard, metal, including but not limited to aluminum, magnesium, titanium, and alloys thereof, plastic material, including but not limited to polyester, polyurethane, polyamides, polycarbonates, polystyrenes, acrylonitrile butadiene styrene (ABS), and mixtures thereof, and aramid polymers, including but not limited to Nomex and Kevlar. Alternatively, as shown in FIG. 2C, the core layer may be corrugated paper or cardboard or corrugated resin-impregnated paper or cardboard.

Resin impregnation of the paper or cardboard or corrugated structures enhances strength and helps resist moisture and fungus, said resin being selected from phenolic resins. Resin content can be varied to match the application and desired physical properties of the molded sandwich; resin content generally ranges from 5% to 30% by weight, preferably 10 to 25%.

Core layer 44 thickness, prior to molding, is in the range of 2 mm to 50 mm, preferably 5 mm to 30 mm. Core layer 44 volumetric density, prior to molding, ranges from 16 to 160 kg/m$^3$, preferably 18 kg/m$^3$ to 96 kg/m$^3$.

A honeycomb or corrugated core layer 44 is further characterized by its cell size, defined as the width of the honeycomb or corrugated repeat unit. Core layers used in this invention have cell sizes selected from the group consisting of 6.35 mm (¼ in), 9.53 mm (⅜ in) 12.7 mm (½ in), 15.88 mm (⅝ in), 19.05 mm (¾ in), 23.81 mm (15/16 in), and 25.4 mm (1.0 in).

The preferred composition of the outer layers 42 and 43 has been previously described in parent application Ser. No. 12/715,084. Landfill-bound scrap material, also referred to as fluff, is obtained by shredding automotive interior trim scrap or components into smaller particles. Such automotive interior trim scrap or components may include the following polymers or a combination of the following polymers and fillers including, but not limited to: flexible, semi-rigid and rigid polyurethane foam, nylon, polyester, filled EVA (ethylene vinyl acetate), polypropylene, glass fibers, cotton and in some cases other natural fibers, such as flax, kanaf, hemp, jute, sisal, wheat straw, coconut husk, and bamboo among others. The composition of the outer layers 42 and 43 does not require the presence of any type of polyurethane foams, but can accommodate these polymers, if present.

The fluff is then blended with an isocyanate adhesive composition that comprises a curable non-aqueous polyisocyanate or curable non-aqueous isocyanate prepolymer. The isocyanate prepolymer can be prepared using an isocyanate component, illustratively including a diisocyanate component and/or a polyisocyanate component. As defined, the terminology polyisocycanate is to be construed as including prepolymers and free polyisocyanates. The isocyanate component generally provides reactive groups, i.e., NCO groups, during subsequent reactions. The isocyanate component may be selected from the group of toluene diisocyanate (TDI), methylene diphenyl diisocyanate (MDI), including dimers, trimers, and higher oligomers thereof. A combination of TDI and MDI may also be used, the TDI may be present in the isocyanate component in an amount of from 65 to 80 parts by weight based on 100 parts by weight of the isocyanate component.

In the case of the isocyanate prepolymer, the isocyanate component is reacted with an isocyanate-reactive component to form a prepolymer. The isocyanate-reactive component generally provides hydroxyl groups for reaction with the NCO groups of the isocyanate component. More specifically, the isocyanate-reactive component may include a polyol. The isocyanate-reactive component may also include at least two polyols. Any known polyol suitable for reaction with the isocyanate component is suitable for purposes of the present invention. For example, the isocyanate-reactive component may be selected from the group of polyether polyols, polyoxyalkylene polyols, polyester polyols, graft polyols, polymer polyols, polyols derived from renewable resources, such as, but not limited to, soy polyols, castor oil polyols, canola oil polyols, rapeseed oil polyols, palm oil polyols, and combinations thereof. Examples of suitable polymer polyols include, but are not limited to, polyol dispersions of styrene/acrylonitrile particles (SAN) and polymer-modified polyols such as polyisocyanate polyaddition (PIPA) polyols and poly Harnstoff dispersion (PHD) polyols.

When the adhesive composition is blended with the fluff, moisture cure of the adhesive composition under heat and pressure yields a molded panel. However, the composition of top and bottom outer layers 42 and 43, positioned on either side of the core layer can be the same or different. Furthermore, top and bottom outer layers 42 and 43 can have the same thickness and surface density, the same thickness and different surface densities, or different thicknesses and the same surface density.

Outer layer 42 and 43 thickness generally ranges from 0.1 mm to 12 mm, preferably 0.5 mm to 10 mm. Surface density, defined as the weight per unit area of outer layers 42 and 43, generally ranges from 200 g/m$^2$ to 2000 g/m$^2$, preferably 500 g/m$^2$ to 1850 g/m$^2$. Prior to the compression molding process of this invention, the outer layers 42 and 43 are not connected to the core 44 by way of adhesive or other mechanical devices; they are merely placed in contact with each other for final product formation. Surface density, or weight per unit area of the molded sandwich structure 10 (without optional decorative layer 48), generally ranges from 1200 g/m$^2$ to 2500 g/m$^2$, preferably 1500 g/m$^2$ to 2050 g/m$^2$.

There can be one optional decorative layer 48 on top of outer the top layer 43, one optional decorative layer 48 on the surface of the mold 36 and below the core layer 44, two optional decorative layers 48—one on top of the outer top layer 43, the other on the surface of the mold 36—or no decorative layers. The optional decorative layers 48 positioned on top of the top outer layer 43 and below the bottom outer layer 42 can be the same or different. The optional decorative layer 48 (FIG. 8) includes, but is not limited to, woven and non-woven carpet, woven and non-woven fabrics, felts, knitted fabrics, braided fabrics, leather, polyurethane, glass, polymers, films, laminates, sheets and scrims, said decorative layers can be with or without adhesive coatings or backings.

The finished article is produced when the outer layers 42 and 43 and the core layer 44 are attached under heat and pressure in the mold. The isocyanate adhesive composition contained in the outer layers 42 and 43 has a double role: after heat and pressure have been applied during the molding process, the moisture-cure adhesive cures the fluff in the outer layers 42 and 43 into two solid outer layers 16 and 17 while at the same time creating a chemical bond between the outer layers 42 and 43 and the core layer 44, yielding molded article 10 comprising molded outer layers 16 and 17 and molded core layer 12 (FIG. 5).

Figure 7:
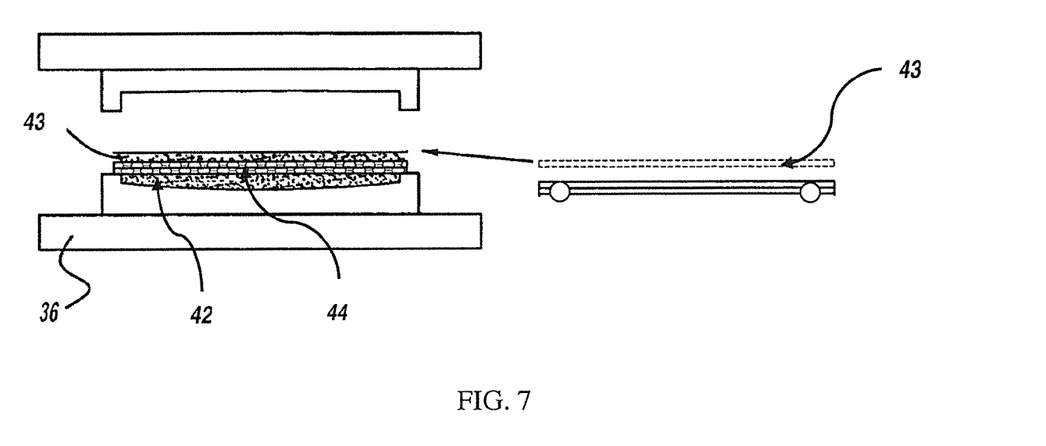
FIG. 7 is the innovative process to form the finished product.

The innovative process is described in detail in FIGS. 6-10. FIG. 6 shows the loading of the honeycomb core layer 44 from a stack of honeycomb sheets or layers onto the top of the bottom outer layer 42 which had already be placed on the bottom press platen or bottom surface of the compression mold 36. In FIG. 7, the top outer layer 43 is transported as a mat on a belt then transferred to the compression mold where it is placed on top of the core honeycomb layer 44. The process for laying the bottom outer layer 42 in the bottom of the compression mold 36 in FIG. 6 is identical to the one just described for the top outer layer 43 in FIG. 7.

Figure 8:
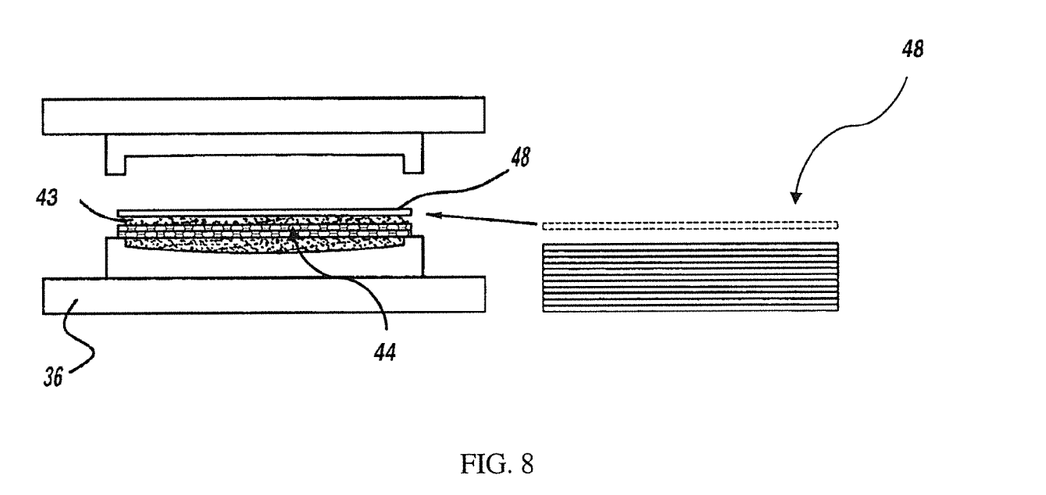
FIG. 8 is the innovative process to form the finished product including a top decorative layer.

FIG. 8 illustrates the optional presence of a decorative layer or coverstock 48 which is placed on top of the top outer layer 43 before the press operation. The outer layer 43 is not connected to the decorative layer 48 by way of adhesive or other mechanical devices; decorative layer 48 and outer layer 43 are merely placed in contact with each other in the molding equipment. Decorative layer 48 can also be placed in the bottom of the tool 36. In the FIG. 8 representation, the decorative layer 48 is dispensed as a discrete sheet, layer, film or scrim; it can also be dispensed from continuous rolls.

Figure 9:
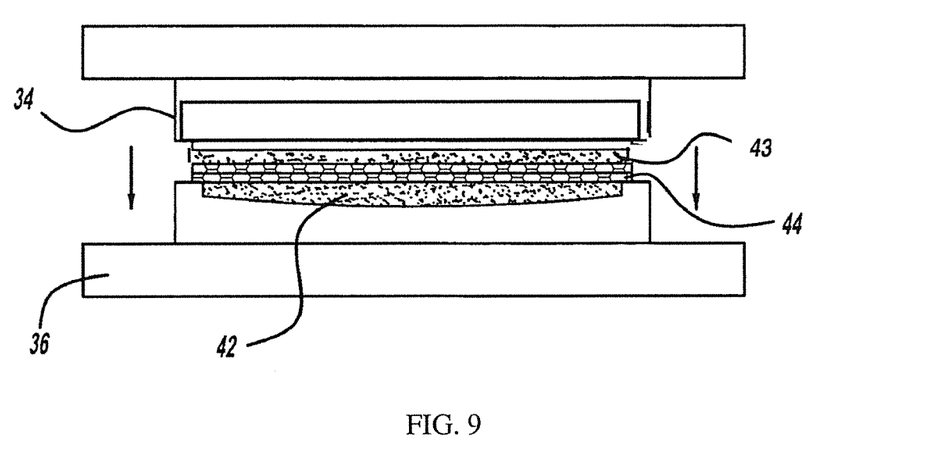
FIG. 9 is the innovative process to form the finished product.

FIG. 9 shows a representative press set-up for molding the innovative structural component 10 from its constituent layers, bottom outer layer 42, core honeycomb layer 44 and top outer layer 43. The press has a top platen 34 and bottom platen 36. Once all layers have been placed in the tool as described in FIGS. 6-8, pressing and heat curing take place by bringing top platen 34 and bottom platen 36 together to close the mold at temperatures ranging from 130° C. to 200° C., preferably between 160° C. and 190° C. Molding times during which the press remains closed generally range from 30 seconds and 10 minutes, preferably between 1 minute and 5 minutes.

Figure 10:
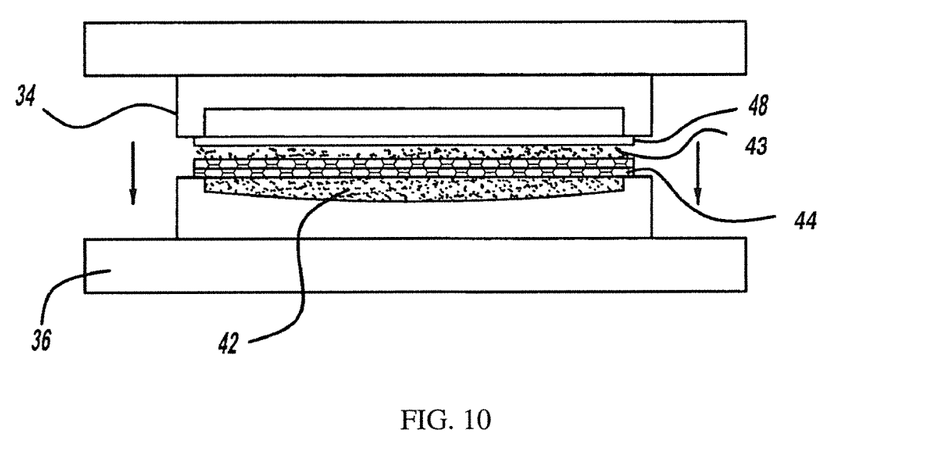
FIG. 10 is the innovative process to form the finished product including a top decorative layer.

FIG. 10 shows a molded process similar to the one of FIG. 9, with the additional presence of a decorative layer 48 positioned on top of the top outer layer 43, as described in FIG. 8.

Example 1

Waste rigid polyurethane foam laminated to plastic film obtained from an automotive headliner manufacturing process is shredded into a fluff and an isocyanate adhesive composition (14.3% by weight) is added to said fluff, as described in U.S. patent application Ser. No. 12/715,084. Fluff blended with the adhesive composition (30 g) is placed on the bottom of a 203 mm×203 mm (8 in×8 in) mold and forms the bottom outer layer of the sandwich.

A 203 mm×203 mm×9.53 mm (8 in×8 in×⅜ in) corrugated cardboard honeycomb weighing 16 g and having a cell size of 9.53 mm (⅜ in.), forms the core layer of the sandwich. This corrugated material, commercially available from Tricel Honeycomb Corp., is placed on top of the 30 g of aforementioned fluff blended with the adhesive composition; finally fluff blended with the adhesive composition (30 g) is placed on the top of the core layer and the entire sandwich is compressed to a nominal 12.7 mm (0.5 in) total thickness.

Compression sufficient to maintain the nominal 12.7 mm final thickness is applied using a Carver press. The sample was left in the press for 3 minutes at a temperature of 180° C. (355° F.). After trimming, the produced composite was 11.68 mm (0.46 in) thick, weighted 70 g and had a surface density of 1,695 g/m$^2$ (158.6 g/ft$^2$). It was stiff and could not be bent without a substantial effort.

Example 2

Waste rigid polyurethane foam laminated to plastic film obtained from an automotive headliner manufacturing process is shredded into a fluff and an isocyanate adhesive composition (14.3% by weight) is added to said fluff, as described in U.S. patent application Ser. No. 12/715,084. Fluff blended with the adhesive composition (30 g) is placed on the bottom of a 203 mm×203 mm (8 in×8 in) mold and forms the bottom outer layer of the sandwich.

A 203 mm×203 mm×9.53 mm (8 in×8 in×⅜ in) corrugated cardboard honeycomb weighing 18 g and having a cell size of 6.35 mm (¼ in.), forms the core layer of the sandwich. This corrugated material, commercially available from Tricel Honeycomb Corp., is placed on top of the 30 g of aforementioned fluff blended with the adhesive composition; finally fluff blended with the adhesive composition (30 g) is placed on the top of the core layer and the entire sandwich is compressed to a nominal 12.7 mm (0.5 in) total thickness.

Compression sufficient to maintain the nominal 12.7 mm final thickness is applied using a Carver press. The sample was left in the press for 3 minutes at a temperature of 180° C. (355° F.). After trimming, the produced composite was 12.70 mm (0.50 in) thick, weighted 72 g and had a surface density of 1,745 g/m$^2$ (162 g/ft$^2$). It was stiffer than Sample 1 and could not be bent without a substantial effort.

Example 3

Waste rigid polyurethane foam laminated to plastic film obtained from an automotive headliner manufacturing process is shredded into a fluff and an isocyanate adhesive composition (14.3% by weight) is added to said fluff, as described in U.S. patent application Ser. No. 12/715,084. A 203 mm×203 mm (8 in×8 in) sheet of 50 g/m$^2$ polyester scrim having a light adhesive backing and weighing 2 g, was placed on the bottom of a 203 mm×203 mm (8 in×8 in) mold, comprising the optional bottom decorative layer. Fluff blended with the adhesive composition (30 g) was placed on the bottom of a 203 mm×203 mm (8 in×8 in) mold and forms the bottom outer layer of the sandwich.

A 203 mm×203 mm×9.53 mm (8 in×8 in×⅜ in) corrugated cardboard honeycomb weighing 18 g and having a cell size of 6.35 mm (¼ in.), forms the core layer of the sandwich. This corrugated material, commercially available from Tricel Honeycomb Corp., is placed on top of the 30 g of aforementioned fluff blended with the adhesive composition; fluff blended with the adhesive composition (30 g) which comprises the top outer layer is placed on the top of the core layer and the entire sandwich is compressed to a nominal 12.7 mm (0.5 in) total thickness.

Finally, a 203 mm×203 mm (8 in×8 in) sheet of 50 g/m$^2$ polyester scrim having a light adhesive backing and weighing 2 g, comprising the optional top decorative layer, was placed on the top of top outer layer. Compression sufficient to maintain the nominal 12.7 mm final thickness is applied using a Carver press. The sample was left in the press for 3 minutes at a temperature of 180° C. (355° F.). After trimming, the produced composite was 13.72 mm (0.54 in) thick, weighted a total of 82 g and had a surface density of 1,985 g/m$^2$ (184.5 g/ft$^2$). It was much stiffer than Sample 2 and could not be bent without a substantial effort.

Example 4

Waste rigid polyurethane foam laminated to plastic film obtained from an automotive headliner manufacturing process is shredded into a fluff and an isocyanate adhesive composition (14.3% by weight) is added to said fluff, as described in U.S. patent application Ser. No. 12/715,084. A 203 mm×203 mm (8 in×8 in) sheet of 50 g/m$^2$ polyester scrim having a light adhesive backing and weighing 2 g, was placed on the bottom of a 203 mm×203 mm (8 in×8 in) mold, comprising the optional bottom decorative layer. Fluff blended with the adhesive composition (28 g) was placed on the bottom of a 203 mm×203 mm (8 in×8 in) mold and forms the bottom outer layer of the sandwich.

A 203 mm×203 mm×9.53 mm (8 in×8 in×⅜ in) phenolic impregnated (15% content) corrugated cardboard honeycomb weighing 20 g and having a cell size of 6.35 mm (¼ in.), forms the core layer of the sandwich. This corrugated material, commercially available from Tricel Honeycomb Corp., is placed on top of the 28 g of aforementioned fluff blended with the adhesive composition; fluff blended with the adhesive composition (28 g) which comprises the top outer layer is placed on the top of the core layer. Finally, a 203 mm×203 mm (8 in×8 in) sheet of 50 g/m$^2$ polyester scrim having a light adhesive backing and weighing 2 g, comprising the optional top decorative layer, was placed on top of top outer layer.

Compression sufficient to maintain a nominal 12.7 mm final thickness is applied using a Carver press. The sample was left in the press for 3 minutes at a temperature of 180° C. (355° F.). After trimming, the produced composite was 13.72 mm (0.54 in) thick, weighted a total of 74 g and had a surface density of 1,790 g/m$^2$ (166.5 g/ft$^2$). It was much stiffer than Sample 3 and could not be bent without a substantial effort.

Example 5

Waste rigid polyurethane foam laminated to plastic film obtained from an automotive headliner manufacturing process is shredded into a fluff and an isocyanate adhesive composition (14.3% by weight) is added to said fluff, as described in U.S. patent application Ser. No. 12/715,084. Fluff blended with the adhesive composition (28 g) is placed on the bottom of a 203 mm×203 mm (8 in×8 in) mold and forms the bottom outer layer of the sandwich.

A 203 mm×203 mm×15.88 mm (8 in×8 in×⅝ in) cardboard honeycomb weighing 16 g and having a cell size of 15.88 mm (⅝ in), forms the core layer of the sandwich. This honeycomb material, commercially available from Cortek, Inc., is placed on top of the 28 g of aforementioned fluff blended with the adhesive composition; finally fluff blended with the adhesive composition (32 g) is placed on the top of the core layer and the entire sandwich is compressed to a nominal 12.7 mm (0.5 in) total thickness.

Compression sufficient to maintain the nominal 12.7 mm final thickness is applied using a Carver press. The sample was left in the press for 3 minutes at a temperature of 180° C. (355° F.). After trimming, the produced composite was 11.43 mm (0.45 in) thick, weighted 68 g and had a surface density of 1,647 g/m$^2$ (153 g/ft$^2$). It was not as stiff as Sample 1 and could be slightly bent with a less than substantial effort.

Example 6

Waste rigid polyurethane foam laminated to plastic film obtained from an automotive headliner manufacturing process is shredded into a fluff and an isocyanate adhesive composition (14.3% by weight) is added to said fluff, as described in U.S. patent application Ser. No. 12/715,084. A 203 mm×203 mm (8 in×8 in) sheet of 50 g/m$^2$ polyester scrim having a light adhesive backing and weighing 2 g, was placed on the bottom of a 203 mm×203 mm (8 in×8 in) mold, comprising the optional bottom decorative layer. Fluff blended with the adhesive composition (28 g) was placed on the bottom of the 203 mm×203 mm (8 in×8 in) mold and forms the bottom outer layer of the sandwich.

A 203 mm×203 mm×15.88 mm (8 in×8 in×⅝ in) cardboard honeycomb weighing 16 g and having a cell size of 15.88 mm (⅝ in), forms the core layer of the sandwich. This corrugated material, commercially available from Cortek, Inc., is placed on top of the 28 g of aforementioned fluff blended with the adhesive composition; fluff blended with the adhesive composition (32 g) which comprises the top outer layer is placed on the top of the core.

Finally, a 203 mm×203 mm (8 in×8 in) sheet of 50 g/m$^2$ polyester scrim having a light adhesive backing and weighing 2 g, comprising the optional top decorative layer, was placed on the top of top outer layer. Compression sufficient to maintain the nominal 12.7 mm final thickness is applied using a Carver press. The sample was left in the press for 3 minutes at a temperature of 180° C. (355° F.). After trimming, the produced composite was 13.72 mm (0.54 in) thick, weighted a total of 74 g and had a surface density of 1,790 g/m$^2$ (166.5 g/ft$^2$). It was substantially less stiff than Sample 3 and could be bent with some effort.

Example 7

Waste headliner material obtained from an automotive headliner manufacturing process is shredded into a fluff and an isocyanate adhesive composition (17.5% by weight) is added to said fluff, as described in U.S. patent application Ser. No. 12/715,084. Fluff blended with the adhesive composition (35 g) is placed on the bottom of a 203 mm×203 mm (8 in×8 in) mold and forms the bottom outer layer of the sandwich.

A 203 mm×203 mm×9.53 mm (8 in×8 in×⅜ in) corrugated cardboard honeycomb weighing 16 g and having a cell size of 6.35 mm (¼ in.), forms the core layer of the sandwich. This corrugated material, commercially available from Tricel Honeycomb Corp., is placed on top of the 35 g of aforementioned fluff blended with the adhesive composition; finally fluff blended with the adhesive composition (35 g) is placed on the top of the core layer and the entire sandwich is compressed to a nominal 12.7 mm (0.5 in) total thickness.

Compression sufficient to maintain the nominal 12.7 mm final thickness is applied using a Carver press. The sample was left in the press for 3 minutes at a temperature of 180° C. (355° F.). After trimming, the produced composite was 11.56 mm (0.455 in) thick, weighted 76 g and had a surface density of 1,840 g/m$^2$ (171 g/ft$^2$). It was stiffer than Sample 1 and could not be bent without a substantial effort.

Example 8

Waste headliner material obtained from an automotive headliner manufacturing process is shredded into a fluff and an isocyanate adhesive composition (17.5% by weight) is added to said fluff, as described in U.S. patent application Ser. No. 12/715,084. A 203 mm×203 mm (8 in×8 in) sheet of 50 g/m$^2$ polyester scrim having a light adhesive backing and weighing 2 g, was placed on the bottom of a 203 mm×203 mm (8 in×8 in) mold, comprising the optional bottom decorative layer. Fluff blended with the adhesive composition (30 g) was placed on the bottom of a 203 mm×203 mm (8 in×8 in) mold and forms the bottom outer layer of the sandwich.

A 203 mm×203 mm×9.53 mm (8 in×8 in×⅜ in) corrugated cardboard honeycomb weighing 16 g and having a cell size of 6.35 mm (¼ in.), forms the core layer of the sandwich. The corrugated material, commercially available from Tricel Honeycomb Corp., is placed on top of the 30 g of aforementioned fluff blended with the adhesive composition; fluff blended with the adhesive composition (30 g) which comprises the top outer layer is placed on the top of the core layer.

Finally, a 203 mm×203 mm (8 in×8 in) sheet of 50 g/m$^2$ polyester scrim having a light adhesive backing and weighing 2 g, comprising the optional top decorative layer, was placed on the top of top outer layer. Compression sufficient to maintain a nominal 12.7 mm final thickness is applied using a Carver press. The sample was left in the press for 3 minutes at a temperature of 180° C. (355° F.). After trimming, the produced composite was 11.05 mm (0.435 in) thick, weighted a total of 76 g and had a surface density of 1,840 g/m$^2$ (171 g/ft$^2$). It was slightly less stiff than Sample 3 and could not be bent without a substantial effort.

Example 9

Waste headliner material obtained from an automotive headliner manufacturing process is shredded into a fluff and an isocyanate adhesive composition (17.5% by weight) is added to said fluff, as described in U.S. patent application Ser. No. 12/715,084. Fluff blended with the adhesive composition (35 g) was placed on the bottom of a 203 mm×203 mm (8 in×8 in) mold and forms the bottom outer layer of the sandwich.

A 203 mm×203 mm×9.53 mm (8 in×8 in×⅜ in) phenolic-impregnated (15% content) corrugated cardboard honeycomb weighing 20 g and having a cell size of 6.35 mm (¼ in.), forms the core layer of the sandwich. This corrugated material, commercially available from Tricel Honeycomb Corp., is placed on top of the 35 g of aforementioned fluff blended with the adhesive composition; fluff blended with the adhesive composition (35 g) which comprises the top outer layer is placed on the top of the core layer and the entire sandwich is compressed to a nominal 12.7 mm (0.5 in) total thickness.

Compression sufficient to maintain the nominal 12.7 mm final thickness is applied using a Carver press. The sample was left in the press for 3 minutes at a temperature of 180° C. (355° F.). After trimming, the produced composite was 11.43 mm (0.45 in) thick, weighted a total of 80 g and had a surface density of 1,937 g/m$^2$ (180 g/ft$^2$). It was slightly stiffer than Sample 2 and could not be bent without a substantial effort.

Example 10

Waste headliner material obtained from an automotive headliner manufacturing process is shredded into a fluff and an isocyanate adhesive composition (17.5% by weight) is added to said fluff, as described in U.S. patent application Ser. No. 12/715,084. A 203 mm×203 mm (8 in×8 in) sheet of 50 g/m² polyester scrim having a light adhesive backing and weighing 3 g, was placed on the bottom of a 203 mm×203 mm (8 in×8 in) mold, comprising the optional bottom decorative layer. Fluff blended with the adhesive composition (30 g) was placed on the bottom of the 203 mm×203 mm (8 in×8 in) mold and forms the bottom outer layer of the sandwich.

A 203 mm×203 mm×9.53 mm (8 in×8 in×⅜ in) phenolic impregnated (15% content) corrugated cardboard honeycomb weighing 20 g and having a cell size of 6.35 mm (¼ in.), forms the core layer of the sandwich. This corrugated material, commercially available from Tricel Honeycomb Corp., is placed on top of the 30 g of aforementioned fluff blended with the adhesive composition; fluff blended with the adhesive composition (30 g) which comprises the top outer layer is placed on the top of the core layer. Finally, a 203 mm×203 mm (8 in×8 in) sheet of 50 g/m² polyester scrim having a light adhesive backing and weighing 3 g, comprising the optional top decorative layer, was placed on top of the top outer layer.

Compression sufficient to maintain a nominal 12.7 mm final thickness is applied using a Carver press. The sample was left in the press for 3 minutes at a temperature of 180° C. (355° F.). After trimming, the produced composite was 11.43 mm (0.45 in) thick, weighted a total of 80 g and had a surface density of 1,937 g/m² (180 g/ft²). It was about the same stiffness as Sample 3 and could not be bent without a substantial effort.

Example 11

Waste headliner material obtained from an automotive headliner manufacturing process is shredded into a fluff and an isocyanate adhesive composition (17.5% by weight) is added to said fluff, as described in U.S. patent application Ser. No. 12/715,084. Fluff blended with the adhesive composition (25 g) is placed on the bottom of a 203 mm×203 mm (8 in×8 in) mold and forms the bottom outer layer of the sandwich.

A 203 mm×203 mm×12.70 mm (8 in×8 in×½ in) corrugated cardboard honeycomb weighing 18 g and having a cell size of 9.53 mm (⅜ in.), forms the core layer of the sandwich. This corrugated material, commercially available from Tricel Honeycomb Corp., is placed on top of the 25 g of aforementioned fluff blended with the adhesive composition; finally fluff blended with the adhesive composition (35 g) is placed on the top of the core layer and the entire sandwich is compressed to a nominal 12.7 mm (0.5 in) total thickness.

Compression sufficient to maintain the nominal 12.7 mm final thickness is applied using a Carver press. The sample was left in the press for 3 minutes at a temperature of 180° C. (355° F.). After trimming, the produced composite was 11.18 mm (0.44 in) thick, weighted 72 g and had a surface density of 1,744 g/m² (162 g/ft²). It was as stiff as Sample 1 and could not be bent without a substantial effort.

Example 12

Waste headliner material obtained from an automotive headliner manufacturing process is shredded into a fluff and an isocyanate adhesive composition (17.5% by weight) is added to said fluff, as described in U.S. patent application Ser. No. 12/715,084. A 203 mm×203 mm (8 in×8 in) sheet of 50 g/m² polyester scrim having a light adhesive backing and weighing 2 g, was placed on the bottom of a 203 mm×203 mm (8 in×8 in) mold, comprising the optional bottom decorative layer. Fluff blended with the adhesive composition (25 g) was placed on the bottom of a 203 mm×203 mm (8 in×8 in) mold and forms the bottom outer layer of the sandwich.

A 203 mm×203 mm×9.53 mm (8 in×8 in×⅜ in) corrugated cardboard honeycomb weighing 18 g and having a cell size of 6.35 mm (¼ in.), forms the core layer of the sandwich. This corrugated material, commercially available from Tricel Honeycomb Corp., is placed on top of the 25 g of aforementioned fluff blended with the adhesive composition; fluff blended with the adhesive composition (35 g) which comprises the top outer layer is placed on the top of the core layer and the entire sandwich is compressed to a nominal 12.7 mm (0.5 in) total thickness.

Finally, a 203 mm×203 mm (8 in×8 in) sheet of 50 g/m² polyester scrim having a light adhesive backing and weighing 2 g, comprising the optional top decorative layer, was placed on the top of top outer layer. Compression sufficient to maintain the nominal 12.7 mm final thickness is applied using a Carver press. The sample was left in the press for 3 minutes at a temperature of 180° C. (355° F.). After trimming, the produced composite was 10.67 mm (0.42 in) thick, weighted a total of 76 g and had a surface density of 1,840 g/m² (171.5 g/ft²). It was not as stiff as Sample 3 but could not be bent without a substantial effort.

Example 13

Waste headliner material obtained from an automotive headliner manufacturing process is shredded into a fluff and an isocyanate adhesive composition (17.5% by weight) is added to said fluff, as described in U.S. patent application Ser. No. 12/715,084. A 203 mm×203 mm (8 in×8 in) sheet of 50 g/m² polyester scrim having a light adhesive backing and weighing 2 g, was placed on the bottom of a 203 mm×203 mm (8 in×8 in) mold, comprising the optional bottom decorative layer. Fluff blended with the adhesive composition (30 g) was placed on the bottom of a 203 mm×203 mm (8 in×8 in) mold and forms the bottom outer layer of the sandwich.

A 203 mm×203 mm×12.7 mm (8 in×8 in×½ in) corrugated cardboard honeycomb weighing 18 g and having a cell size of 9.53 mm (⅜ in.), forms the core layer of the sandwich. This corrugated material, commercially available from Tricel Honeycomb Corp., is placed on top of the 30 g of aforementioned fluff blended with the adhesive composition; fluff blended with the adhesive composition (30 g) which comprises the top outer layer is placed on the top of the core layer.

Finally, a 203 mm×203 mm (8 in×8 in) sheet of leather whose uneven back surface is to be put in contact with the top outer layer, was placed on top of said top outer layer. The leather sheet weighted 40 g; it comprised the optional top decorative layer. Compression sufficient to maintain the nominal 12.7 mm final thickness is applied using a Carver press. The sample was left in the press for 5 minutes at a temperature of 180° C. (355° F.). After trimming, the produced composite weighted a total of 110 g. It was not as stiff as Sample 3 but could not be bent without a substantial effort.

Example 14

Waste headliner material obtained from an automotive headliner manufacturing process is shredded into a fluff and an isocyanate adhesive composition (17.5% by weight) is added to said fluff, as described in U.S. patent application Ser. No. 12/715,084. Fluff blended with the adhesive composition (28 g) is placed on the bottom of a 203 mm×203 mm (8 in×8 in) mold and forms the bottom outer layer of the sandwich.

A 203 mm×203 mm×15.88 mm (8 in×8 in×⅝ in) cardboard honeycomb weighing 16 g and having a cell size of 15.88 mm (⅝ in), forms the core layer of the sandwich. This honeycomb material, commercially available from Cortek, Inc., is placed on top of the 28 g of aforementioned fluff blended with the adhesive composition; finally fluff blended with the adhesive composition (32 g) is placed on the top of the core layer and the entire sandwich is compressed to a nominal 12.7 mm (0.5 in) total thickness.

Compression sufficient to maintain the nominal 12.7 mm final thickness is applied using a Carver press. The sample was left in the press for 3 minutes at a temperature of 180° C. (355° F.). After trimming, the produced composite was 11.18 mm (0.44 in) thick, weighted 70 g and had a surface density of 1,695 g/m² (158 g/ft²). It was about as stiff as Sample 5 and could be slightly bent with a substantial effort.

Example 15

Waste headliner material obtained from an automotive headliner manufacturing process is shredded into a fluff and an isocyanate adhesive composition (17.5% by weight) is added to said fluff, as described in patent application Ser. No. 12/715,084. A 203 mm×203 mm (8 in×8 in) sheet of 50 g/m² polyester scrim having a light adhesive backing and weighing 2 g, was placed on the bottom of a 203 mm×203 mm (8 in×8 in) mold, comprising the optional bottom decorative layer. Fluff blended with the adhesive composition (28 g) was placed on the bottom of the 203 mm×203 mm (8 in×8 in) mold and forms the bottom outer layer of the sandwich.

A 203 mm×203 mm×15.88 mm (8 in×8 in×⅝ in) cardboard honeycomb weighing 18 g and having a cell size of 15.88 mm (⅝ in), forms the core layer of the sandwich. This corrugated material, commercially available from Cortek, Inc., is placed on top of the 28 g of aforementioned fluff blended with the adhesive composition; fluff blended with the adhesive composition (32 g) which comprises the top outer layer is placed on the top of the core layer.

Finally, a 203 mm×203 mm (8 in×8 in) sheet of 50 g/m² polyester scrim having a light adhesive backing and weighing 2 g, comprising the optional top decorative layer, was placed on the top of top outer layer. Compression sufficient to maintain the nominal 12.7 mm final thickness is applied using a Carver press. The sample was left in the press for 3 minutes at a temperature of 180° C. (355° F.). After trimming, the produced composite was 11.56 mm (0.455 in) thick, weighted a total of 76 g and had a surface density of 1,840 g/m² (171 g/ft²). It was slightly less stiff than Sample 6 but could be bent with some effort.

The invention claimed is:

1. A method of producing useful, multilayered articles from recycled materials, comprising the steps of:

placing a first outer layer into a thermal compression mold, the first outer layer being composed of shredded scrap material mixed with a curable adhesive or binder;
placing a core layer over the first outer layer in the mold;
placing a second outer layer over the core layer in the mold, the second outer layer also being composed of shredded scrap material mixed with a curable adhesive or binder; and
compressing the layers with heat in a single operation for a specified amount of time to produce a composite article.

2. The method of claim 1, wherein the article is formed without the use of any adhesives other than the adhesive in the curable outer layers.

3. The method of claim 1, wherein the article is formed without the use of cast or spray resin compositions or reinforcing fiber mats.

4. The method of claim 1, wherein the shredded scrap material includes automotive interior trim parts.

5. The method of claim 1, wherein the adhesive or binder is a non-aqueous, isocyanate prepolymer adhesive or binder that is cured without adding water to the mixture.

6. The method of claim 1, wherein the curable adhesive is an isocyanate prepolymer adhesive or binder produced by reacting an isocyanate component with an isocyanate-reactive component.

7. The method of claim 1, including the step of positioning a decorative layer on top of the first outer layer or below the second outer layer prior to compression.

8. The method of claim 1, including the step of positioning a decorative coverstock, textile or other polymeric film, sheet or scrim on top of the first outer layer or below the second outer layer prior to compression.

9. The method of claim 1, wherein the core layer has a corrugated or honeycomb structure.

10. The method of claim 1, wherein the core layer is a solid structure.

11. The method of claim 1, wherein the core layer includes foam.

12. The method of claim 1, wherein the core layer includes a plurality of parallel tubes creating a partially voided structure.

13. The method of claim 1, wherein the wherein the curing takes place at a temperature in the range of 10 to 200° C.

14. The method of claim 1, wherein the curing takes place at a temperature in the range of 15 to 50° C.

15. The method of claim 1, further including the step of adding glass fibers to the outer layer mixtures prior to curing.

16. The method of claim 1, further including the step of trimming the article to produce a panel, component or part having a desired shape.

* * * * *